US011336690B1

(12) United States Patent
Urias et al.

(10) Patent No.: US 11,336,690 B1
(45) Date of Patent: May 17, 2022

(54) THREAT EMULATION FRAMEWORK

(71) Applicant: National Technology & Engineering Solutions of Sandia, LLC, Albuquerque, NM (US)

(72) Inventors: Vincent Urias, Albuquerque, NM (US); David Jakob Fritz, Fort Collins, CO (US); Michael Kunz, Gretna, NE (US); Caleb Loverro, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 262 days.

(21) Appl. No.: 16/685,907

(22) Filed: Nov. 15, 2019

(51) Int. Cl.
*G06F 9/455* (2018.01)
*H04L 9/40* (2022.01)
*H04L 29/06* (2006.01)

(52) U.S. Cl.
CPC ...... *H04L 63/1491* (2013.01); *H04L 63/1433* (2013.01); *G06F 9/45558* (2013.01); *G06F 2009/45562* (2013.01)

(58) Field of Classification Search
CPC ............ H04L 63/1491; H04L 63/1433; G06F 9/45558; G06F 2009/45562
See application file for complete search history.

(56) References Cited

U.S. PATENT DOCUMENTS

| | | | | |
|---|---|---|---|---|
| 7,234,167 B2* | 6/2007 | Teblyashkin | .......... | G06F 21/564 703/23 |
| 8,584,094 B2* | 11/2013 | Dadhia | ................ | G06F 21/566 717/127 |
| 9,165,142 B1* | 10/2015 | Sanders | .............. | H04L 63/1441 |
| 9,215,239 B1* | 12/2015 | Wang | .................... | G06F 21/566 |
| 9,495,188 B1* | 11/2016 | Ettema | ................ | G06F 9/45533 |
| 9,716,727 B1* | 7/2017 | Seger | .................. | H04L 63/1491 |
| 9,882,929 B1* | 1/2018 | Ettema | ................ | H04L 63/1491 |
| 10,735,374 B2* | 8/2020 | Gan | ........................ | H04L 29/06 |

(Continued)

OTHER PUBLICATIONS

N. Miramirkhani, M. P. Appini, N. Nikiforakis and M. Polychronakis, "Spotless Sandboxes: Evading Malware Analysis Systems Using Wear-and-Tear Artifacts," 2017 IEEE Symposium on Security and Privacy (SP), 2017, pp. 1009-1024, doi: 10.1109/SP.2017.42. (Year: 2017).*

(Continued)

*Primary Examiner* — Jeremy S Duffield
*Assistant Examiner* — Sameera Wickramasuriya
(74) *Attorney, Agent, or Firm* — Yee & Associates, P.C.

(57) ABSTRACT

A method for emulating threats in virtual network computing environment is provided. The method comprises creating a number of virtual machines in the virtual network computing environment. A number of threat actors are emulated, wherein each threat actor comprises a number of threat artifacts that form a sequence of attack steps against the virtual network computing environment. The threat actors are then deployed against the virtual network computing environment. Behavioral data about actions of the threat actors in the virtual network computing environment is collected, as is performance data about the virtual network computing environment in response to the threat actors. The collected behavioral and performance data is then presented to a user via an interface.

21 Claims, 8 Drawing Sheets

(56) References Cited

U.S. PATENT DOCUMENTS

| | | | | |
|---|---|---|---|---|
| 10,958,667 | B1* | 3/2021 | Maida | H04L 63/1483 |
| 2008/0016570 | A1* | 1/2008 | Capalik | G06F 21/566 |
| | | | | 726/23 |
| 2009/0158432 | A1* | 6/2009 | Zheng | G06F 21/53 |
| | | | | 726/24 |
| 2016/0149950 | A1* | 5/2016 | Ashley | H04L 63/1491 |
| | | | | 726/23 |
| 2017/0124321 | A1* | 5/2017 | Qian | G06F 21/53 |
| 2017/0126736 | A1* | 5/2017 | Urias | G06F 21/554 |
| 2017/0250997 | A1* | 8/2017 | Rostamabadi | H04L 63/1425 |
| 2017/0251002 | A1* | 8/2017 | Rostamabadi | G06F 21/566 |
| 2018/0046802 | A1* | 2/2018 | Pyles | G06F 21/53 |
| 2018/0165451 | A1* | 6/2018 | Kawakita | G06F 9/45558 |
| 2019/0182273 | A1* | 6/2019 | Walsh | H04L 63/1483 |
| 2020/0177608 | A1* | 6/2020 | Okunlola | H04L 63/1433 |
| 2020/0272734 | A1* | 8/2020 | Tora | G06N 20/00 |
| 2021/0144178 | A1* | 5/2021 | Bailey | H04L 63/145 |

OTHER PUBLICATIONS

Mohaisen, Aziz, et al. "Network-based analysis and classification of malware using behavioral artifacts ordering." arXiv preprint arXiv: 1901.01185 (2019). (Year: 2019).*

Dinaburg, Artem, et al. "Ether: malware analysis via hardware virtualization extensions." Proceedings of the 15th ACM conference on Computerand communications security. 2008. (Year: 2008).*

* cited by examiner

THREAT EMULATION FRAMEWORK

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND INFORMATION

1. Field

The present disclosure relates generally to an improved computer network and, in particular, to a method and apparatus for a computer network defense system. Still more particularly, the present disclosure relates to a method and apparatus for using deception to protect a computer network.

2. Background

Many organizations employ computer networks in day-to-day activities. These activities include activities such as payroll, human resources, research, sales, marketing, and other suitable activities. These types of activities often include connectivity of internal computer networks to the outside world through the Internet.

More often, organizations are attacked and compromised by adversaries. The adversaries may steal information about customers, transactions, research, or other confidential or sensitive information. In other cases, adversaries may take actions that cause the organization to be unable to perform at a desired level.

In protecting computer networks from adversaries, various tools are currently present for use by organizations. These tools include signature-based detectors, whitelisting, blacklisting, intrusion detection and protection systems, and other suitable types of tools.

Actions that may be taken using these types of tools include, for example, unplugging compromised hosts, quarantining compromised hosts, and other suitable actions. These types of actions, however, are reactionary and do not provide an ability to obtain insight into the actions taken by an adversary attacking computer network. This type of information is often useful in mitigating the effects of a current attack or protecting against future attacks on a computer network.

One solution involves the use of honeypots. A honeypot is a trap that is used to detect, deflect, or in some other manner counteract the attempts at unauthorized use of a computer network. With a honeypot, a portion of the network system may be isolated from the rest of the network. The honeypot may contain information or resources that may be desirable to an adversary. This honeypot may monitor or obtain information about the actions performed by an adversary.

However, the use of honeypots has not been effective, particularly when honeypots can be detected. Honeypots often do not provide a sufficiently realistic environment in which the adversary will perform actions to show its capabilities.

Thus, despite the expenditure of significant amounts of money and effort, computer networks are not as secure against attacks from adversaries as desired. Further, attacks from adversaries are becoming more aggressive and widespread. Therefore, it would be desirable to have a method and apparatus that take into account at least some of the issues discussed above, as well as other possible issues. For example, it would be desirable to have a method and apparatus that overcome the technical problem with obtaining information about an adversary to mitigate the current attack or prevent future attacks on a computer network.

SUMMARY

An embodiment of the present disclosure provides a method for emulating threats in virtual network computing environment. The method comprises creating a number of virtual machines in the virtual network computing environment. A number of threat actors are emulated, wherein each threat actor comprises a number of threat artifacts that form a sequence of attack steps against the virtual network computing environment. The threat actors are then deployed against the virtual network computing environment. Behavioral data about actions of the threat actors in the virtual network computing environment is collected, as is performance data about the virtual network computing environment in response to the threat actors. The collected behavioral and performance data is then presented to a user via an interface.

Another embodiment provides a computer program product for emulating threats in virtual network computing environment. The computer program product comprises a non-volatile computer readable storage medium having program instructions embodied therewith, the program instructions executable by a number of processors to cause the computer to perform the steps of: creating a number of virtual machines in the virtual network computing environment; emulating a number of threat actors, wherein each threat actor comprises a number of threat artifacts that form a sequence of attack steps against the virtual network computing environment; deploying the threat actors against the virtual network computing environment; collecting behavioral data about actions of the threat actors in the virtual network computing environment; collecting performance data about the virtual network computing environment in response to the threat actors; and presenting the collected behavioral and performance data to a user via an interface.

Another embodiment provides a system for emulating threats in virtual network computing environment. The system comprises a bus system; a storage device connected to the bus system, wherein the storage device stores program instructions; and a number of processors connected to the bus system, wherein the number of processors execute the program instructions to: create a number of virtual machines in the virtual network computing environment; emulate a number of threat actors, wherein each threat actor comprises a number of threat artifacts that form a sequence of attack steps against the virtual network computing environment; deploy the threat actors against the virtual network computing environment; collect behavioral data about actions of the threat actors in the virtual network computing environment; collect performance data about the virtual network computing environment in response to the threat actors; and present the collected behavioral and performance data to a user via an interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current tools counteracting intrusions into computer networks are either reactionary or do not provide sufficient deception to cause an adversary to perform sufficient actions to gain insight into the adversary.

The illustrative embodiments recognize and take into account that computing environments such as those involving cloud computing and software defined networks (SDNs) are being used more often. For example, the illustrative embodiments recognize and take into account that organizations such as businesses are moving towards virtualized environments using software defined networks (SDN) for day-to-day operations.

The illustrative embodiments provide a mechanism to create, provision, and instrument application layer artifacts for use by generated threat models. By providing a means to select, at experiment design time, vulnerabilities, artifacts, and other threat-leveraged mechanisms, the threat modeling capability has a rich environment in which to act. For example, vulnerable SQL services might be provided for modeling threat agents injecting malformed SQL queries. Currently, this modeling is done ad-hoc and is customized for every experiment. While the need for specific customizations will persist, the illustrative embodiments provide a rich feature set from which to derive unique models. Furthermore, the illustrative embodiments automatically provide permutations of environment artifacts for executing studies in threat analysis across a range of scenarios. This ability enhances the ability to evaluate tools, tactics, and analyses of network defense strategies.

In developing a threat landscape, the illustrative embodiments employ a library of threat artifacts in order to deploy both previously-observed and newly-generated threat models. These artifacts are collected through the decomposition and instrumentation of multistage Advanced Persistent Threat (APT) attacks. An APT actor is known to deploy multiple components/stages within a single attack lifecycle. Specifically, three primary components comprise: 1) initial compromising strategy, 2) zero-day common vulnerabilities and exposures (CVE) exploited within a victim (e.g., to facilitate an initial compromise), and 3) a library of post exploitation tactics (e.g., reconnaissance, lateral movement). After decomposition, the specific implementation artifacts of each component can be instrumented for re-deployment. Using this library of threat artifacts, the illustrative embodiments combine different implementations within each component to compose an APT attack process.

Figure 1:
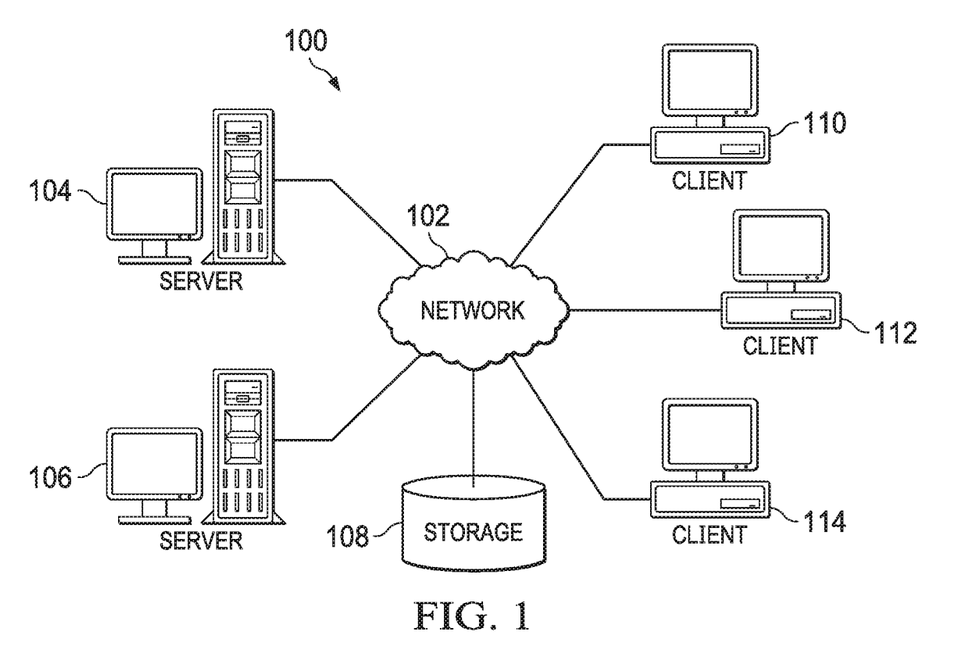
FIG. 1 is a block diagram of an information environment in accordance with an illustrative embodiment.

With reference now to the figures and, in particular, with reference to FIG. 1, a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 might be, for example, personal computers, or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 might include additional server computers, client computers, and other devices not shown.

Program code located in network data processing system 100 can be stored on a computer-recordable storage medium and downloaded to a data processing system or other device for use. For example, the program code might be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware might take the form of a circuit system, an integrated circuit, an application-specific integrated circuit (ASIC), a programmable logic device, or some other suitable type of hardware configured to perform a number of operations. With a programmable logic device, the device might be configured to perform the number of operations. The device might be reconfigured at a later time or might be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
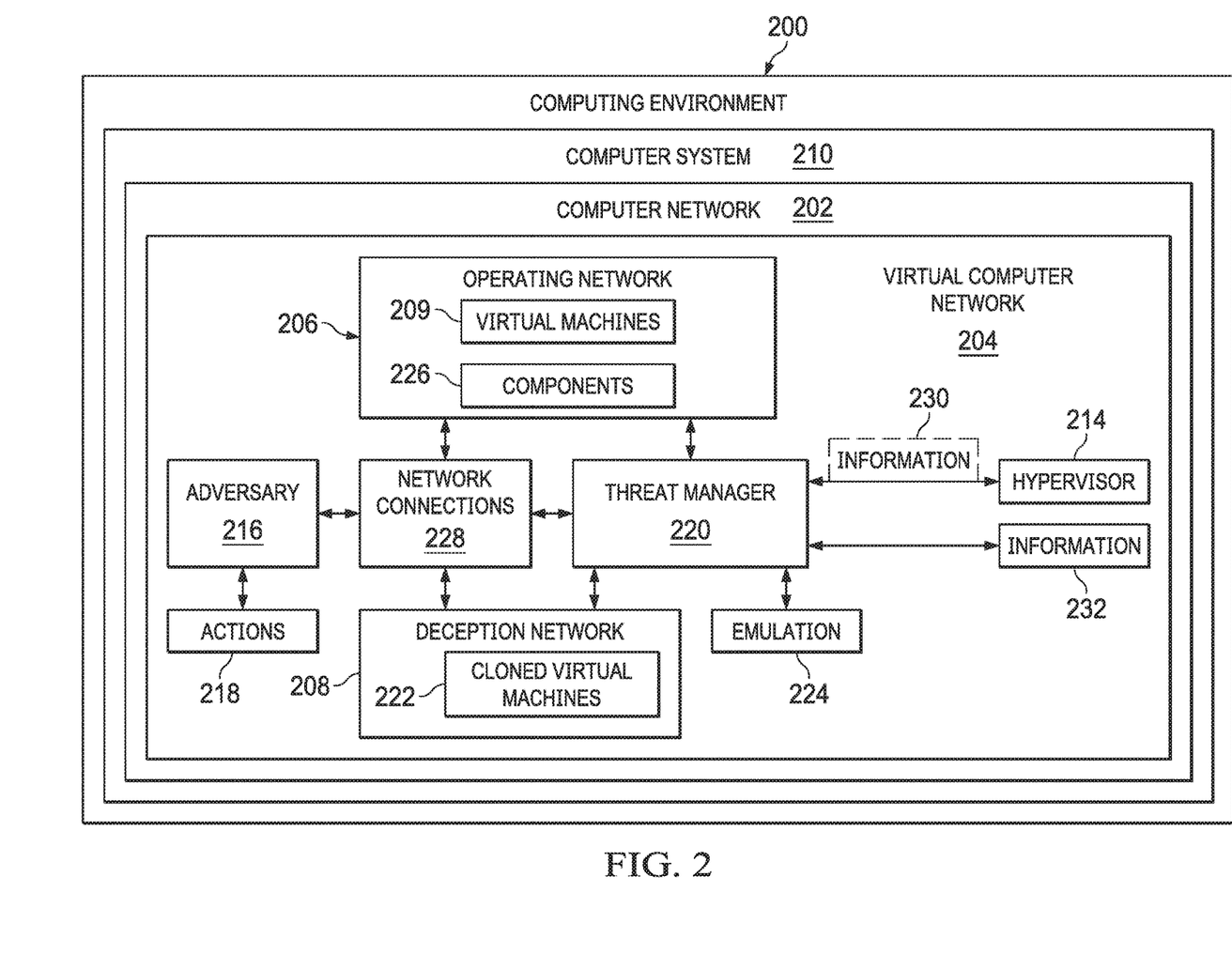
FIG. 2 is a block diagram of a computing environment in accordance with an illustrative embodiment.

FIG. 2 is a block diagram of a computing environment in accordance with an illustrative embodiment. Computing environment 200 might be an example of network data processing system 100 shown in FIG. 1. In this example, computing environment 200 includes computer network 202. As depicted, computer network 202 is virtual computer network 204 and includes operating network 206 and deception network 208. These networks are virtual networks within virtual computer network 204.

As a virtual computer network, computer network 202 runs on computer system 210. Computer system 210 is a hardware system and includes one or more data processing systems. When more than one data processing system is present, those data processing systems might be in communication with each other using a communications medium such as a network. The data processing systems might be selected from at least one of a computer, a server computer, a laptop computer, a work station, a tablet computer, or some other suitable data processing system, e.g., such as those shown in FIG. 1.

Operating network 206 includes virtual machines 209. A virtual machine (VM) is an emulation of a computer that functions like a real computer including emulations of hardware, software, or some combination thereof. In the illustrative example, the virtual machines 209 might emulate other devices, such as a router or access port. Computer system 210 provides the hardware to run virtual machines 209.

Hypervisor 214 is software, firmware, hardware, or some combination thereof, and creates and runs virtual machines 209 and runs in a kernel of an operating system of one or more of the data processing systems in computer system 210. Hypervisor 214 might also be referred to as a virtual machine monitor.

Virtual computer network 204 might be subject to attack by a number of external adversaries (i.e. cyber attack). Attacks can take several forms from hacking to viruses and malware, with the intent of gaining unauthorized access to and control of a number of elements of virtual computer network 204.

Virtual computer network 204 comprises a number of security features and countermeasure to detect and respond to such attacks. Illustrative embodiments provide methods for evaluating and testing the security features by employing a library of threat artifacts to create threat scenarios for a variety of use cases such as evaluating security posture, analytic development of a network environments, sensors actuation, blue team response, etc. A series of steps can be composed to look like a threat actor. This emulation can be executed in several environments. The environment can be fully fictional (simulated) to evaluate how sensors respond to the threat (Do they detect it? Is a sensor able to be validated by the input?). The environment might also be in-situ on an operational system to exercise how the blue team detects threat actions, with the goal of measuring the performance of the as-built network and host sensors. It might also be a training environment, where the training audience does not know the threat actor to which they are being exposed. Computing environment 200 is an example architecture that might be used for any of the above environments.

In this illustrative example, a threat actor such as adversary 216 might attempt to access operating network 206 without authorization. Adversary 216 might be a person, program, computer, or other entity that accesses computer network 202 without authorization. In the illustrative embodiments, adversary 216 might comprise an emulated threat composed from a library of threat artifacts as described above. Adversary 216 might perform actions 218 within operating network 206 through accessing virtual machines 209.

In the illustrative example, threat manager 220 manages unauthorized access by adversary 216. As depicted, threat manager 220 is located between hypervisor 214 and virtual machines 209. For example, threat manager 220 might detect the unauthorized access as well as take actions in response to the unauthorized access by adversary 216. In the example architecture of virtual computer network 204, in response to unauthorized accessed by adversary 116, threat manager 220 can create a copy of a number of the virtual machines 209 to form a number of cloned virtual machines 222 in deception network 208. The cloned virtual machines 222 process data in the same manner as virtual machines 209.

Threat manager 220 can create emulation 224 of components 226 from operating network 206 in deception network 208 so that components 226 are accessible by cloned virtual machines 222 as if they were in operating network 206. This accessibility is seen from the perspective of adversary 216. Emulation 224 simulates the processing of components 226 but does not require a duplication of components 226 in the deception network 208. Emulation 224 behaves in a manner that is consistent with how components 226 would work if they were located in deception network 208, using processes, models, or other program codes that cause emulated components to behave like actual components. In one embodiment, emulation 224 might even be a clone of a component but does not need to be.

Components 226 can be any element that adversary 216 might access. This access might include reading, modifying, downloading, etc. Examples of components 226 include domain controller, file, service, encryption key, email message, document, and executable file.

Threat manager 220 detects a number of network connections 228 used by adversary 216 and moves them from virtual machines 209 to cloned virtual machines 222 in deception network 208. As a result, adversary 216 perform actions 218 in deception network 208 rather than operating network 206.

These and other actions performed by threat manager 220 are performed by monitoring and controlling information 230 that flows between hypervisor 214 and virtual machines 209.

With the use of threat manager 220, adversary 216 is unaware that it has been moved from operating network 206 to deception network 208. With adversary 216 diverted to deception network 208, threat manager 220 can observe and identify information 232 about actions 218 taken by adversary 216.

Examples of actions 218 taken by adversary 216 in deception network 208 include file transfer, file deletion, movement of a file, modification of a file, etc. In this manner, threat manager 220 protects virtual machines 209 from adversary 216.

Threat manager 220 can monitor activities of adversary 216 in each of cloned virtual machines 222 accessed by adversary 216. In the illustrative embodiments, an agent is not included in cloned virtual machines 222. The use of an agent increases the likelihood that adversary 216 will know that it is not accessing the operating network 206. Instead, threat manager performs virtual machines introspection (described in more detail below).

Figure 3:
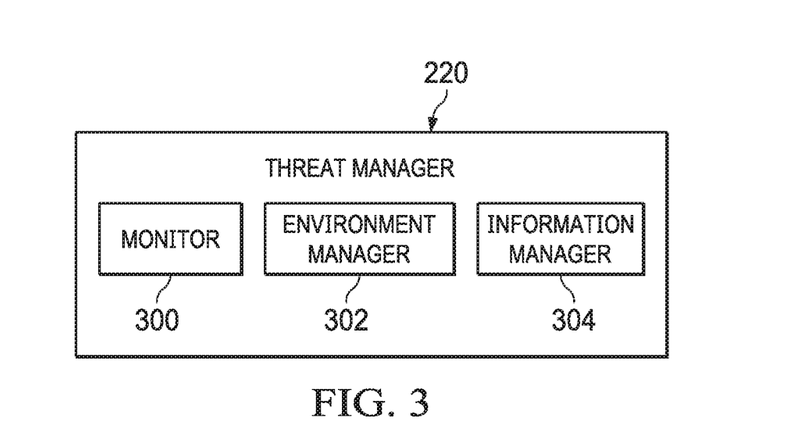
FIG. 3 is a block diagram of components in a threat manager in accordance with an illustrative embodiment.

Turning next to FIG. 3, a block diagram of components in a threat manager is depicted in accordance with an illustrative embodiment. In the illustrative examples, the same reference numeral may be used in more than one figure. This reuse of a reference numeral in different figures represents the same element in the different figures.

In this illustrative example, threat manager 220 includes monitor 300, environment manager 302, and information manager 304.

Monitor 300 monitors at least one of operating network 206 or deception network 208. For example, monitor 300 might monitor information 230 and how information 230 flows between at least one of virtual machines 209 or cloned virtual machines 222.

Additionally, monitor 300 can identify actions 218 taken by adversary 216. Further, monitor 300 also identifies actions taken by adversary 216 after each of the virtual machines accessed by adversary 216 has been cloned and network connections 228 have been moved over to cloned virtual machines 222.

Environment manager 302 creates a number of cloned virtual machines 222 from each of the virtual machines 209 that has been accessed by adversary 216. Additionally, environment manager 302 emulates components 226 that might be accessed by cloned virtual machines 222. Environment manager 302 might also emulate components 226 that have been accessed by adversary 216 in operating network 206. Environment manager 302 can age at least one of cloned virtual machines 222, components 226, and items that have been accessed by adversary 216 to make a cloned virtual machine appear to have been running for a period of time that is substantially the same as a corresponding virtual machine in operating network 206.

Information manager 304 identifies actions that can be taken to mitigate damage that may have been caused by adversary 216. Information manager 304 might operate while the attack is occurring in real time and perform the actions identified, or present the actions to an operator that may perform the actions that result in at least one of mitigating damage, gaining information about adversary 216, or mitigating the attack. Examples of mitigating actions include a change to files in storage devices, changes to data in memory, changes to a flow of information, or some other suitable type of change that mitigates damage done by the attack.

These actions might include modifying information 230 in a manner such that it is unusable by adversary 216. For example, information manager 304 might corrupt a file, an encryption key, or some other type of information to render it unusable. Other examples of modifications to a file include stripping content in the file and replacement of the file. Information manage 304 can also corrupt the network traffic in a manner that prevents file reconstruction when a transmission of the file has completed. The modifications can be made in a manner such that adversary 216 is unaware the information has been modified by information manager 304.

Information manager 304 can also identify actions to take after an attack has occurred. These actions can be used to prevent or mitigate damage from future attacks. These actions might include modifying a file, modifying a message sent within deception network 208, redirecting access, corrupting encryption keys, or other suitable actions.

Figure 4:
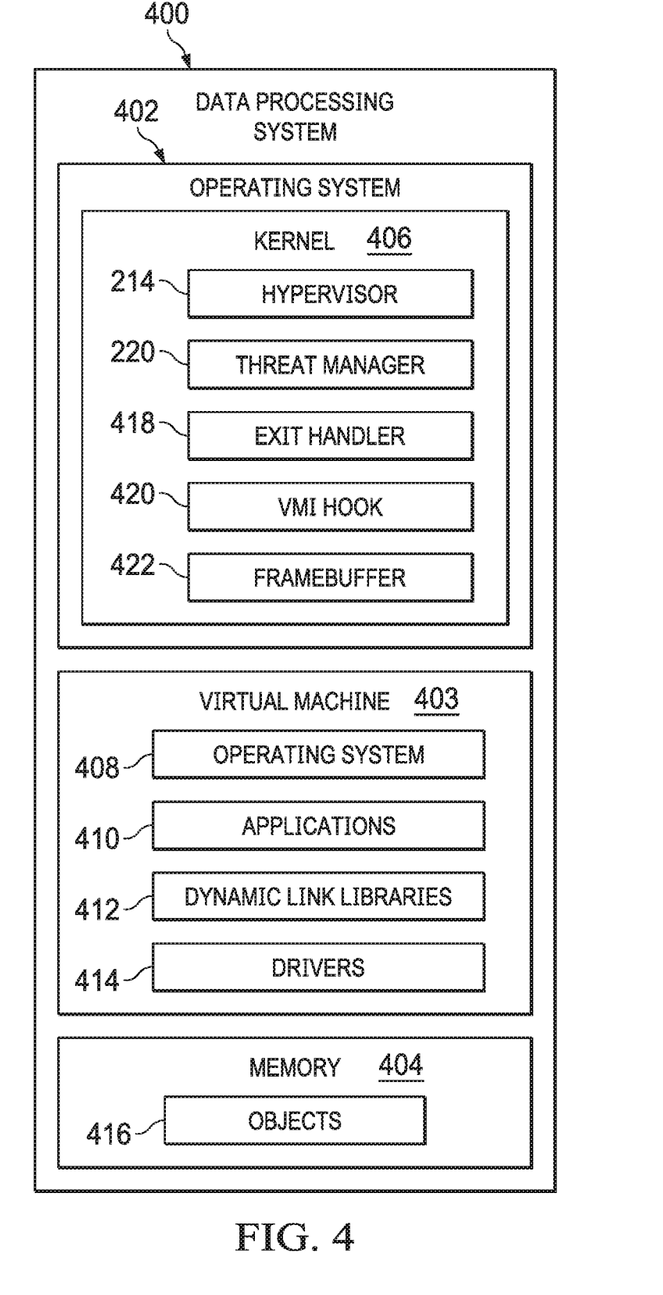
FIG. 4 is a block diagram of a data processing system in accordance with an illustrative embodiment.

Turning now to FIG. 4, a block diagram of a data processing system is depicted in accordance with an illustrative embodiment. In this illustration, data processing system 400 shows one example of an implementation of computer system 110 in FIG. 1.

In this illustrative example, data processing system 400 includes operating system 402, virtual machine 403, and memory 404. Data processing system 400 is the physical device on which virtual machine 403 runs and is typically referred to as the "host," and the virtual machine 403 is referred to as the "guest." For ease of illustration, only one virtual machine 403 is illustrated running host data processing system 400 in the present example. However, multiple virtual machines can, and typically do, run on a single host system.

Operating system 402 is executable code for performing tasks in data processing system 400. These tasks might be running applications, displaying information on graphical user interfaces of display systems, printing files, configuring data processing system 400, or other suitable tasks.

As depicted, operating system 402 includes kernel 406. Kernel 406 is a portion of operating system 402 that manages access to hardware devices of data processing system 400. For example, these hardware devices might comprise memory, communications devices, processors, storage devices, displays, or other types of hardware devices. In the present example, hypervisor 214 and threat manager 220 for virtual machine 403 are implemented as components of kernel 406.

Hypervisor 214 manages virtual machine 403. Hypervisor 214 manages access to hardware devices in data processing system 400 for virtual machine 403. Hypervisor 214 manages this access by creating and assigning virtual hardware devices for virtual machine 403 to use when accessing the hardware devices in host data processing system 400. For example, when virtual machine 403 uses a communications device, it does so through a virtual communications device created and assigned to it by hypervisor 214.

Virtual machine 403 is an example of one of virtual machines 209 or cloned virtual machines 222 in FIG. 2. As depicted, virtual machine 403 includes a number of different components including operating system 408, applications 410, dynamic link libraries 412, and drivers 414. These might also be referred to as a guest operating system, guest applications, etc.

Guest operating system 408 is executable code for performing basic tasks in virtual machine 403. Applications 410 are programs that perform tasks in virtual machine 403 and use operating system 408 to access virtual hardware devices managed by hypervisor 214.

Dynamic link libraries 412 include at least one of data or executable code. Dynamic link libraries 412 are used by at least one of guest applications 410, operating system 408, or drivers 414.

Drivers 414 are executable codes that provide application programming interfaces for accessing hardware devices. For example, a video driver provides access to a display, a wireless device driver provides access to a wireless communication unit, a file system driver provides access to a storage device, etc.

As depicted, memory 404 includes objects 416. Objects are portions of memory 404 used by at least one of host operating system 402, virtual machine 403, or other suitable types of components in data processing system 400. Objects 416 comprise data or executable code. Threat manager 220 monitors the objects 416 to identify information about data processing system 400. The information identified from monitoring objects 416 can then be used by environment manager 302 or information manager 304 to mitigate actions 218 taken by adversary 216.

In this illustrative example, objects 416 for operating system 402 is only accessible by executable code running in kernel 406. In this example, virtual machine 403 is not allowed to access objects 416 for guest operating system 402. Threat manager 220 is allowed access to all objects in objects 416.

In the case of a threat actor (real or emulated) threat manager 220 accesses objects 416 to obtain information 230 about adversary 216. Threat manager 220 also accesses objects 416 to mitigate current attacks or to prevent future attacks on computer network 202, as explained above.

Figure 5:
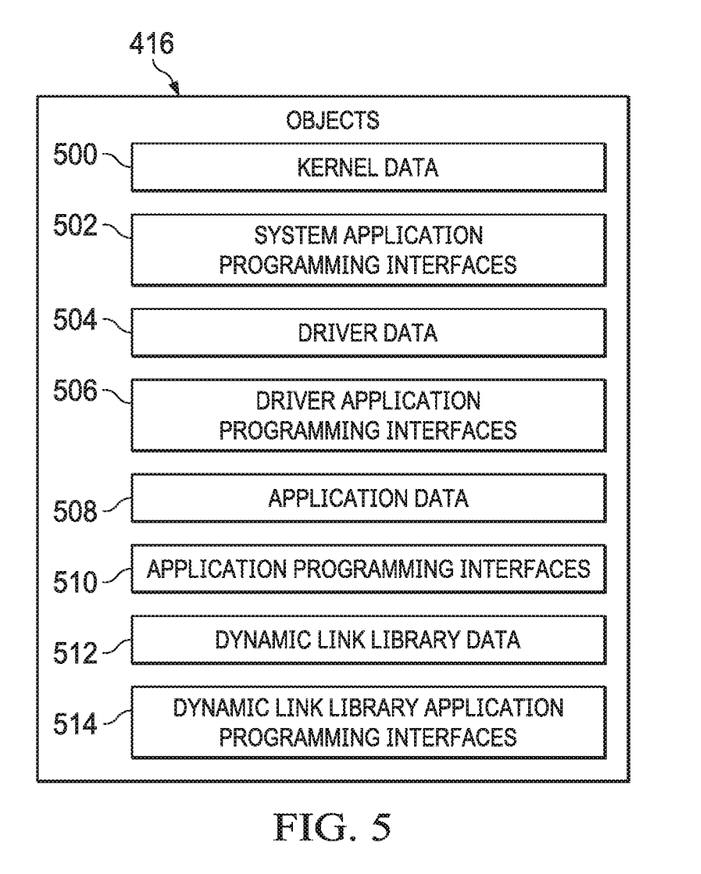
FIG. 5 is a block diagram of objects in memory for an operating system in accordance with an illustrative embodiment.

FIG. 5 is a block diagram of objects in memory for an operating system in accordance with an illustrative embodiment. In this illustration, an example of objects 416 located in memory 404 in FIG. 4 is shown.

As shown, objects 416 include kernel data 500, system application programming interfaces (API) 502, driver data 504, driver APIs 506, application data 508, APIs 510 for application, dynamic link library data 512, and dynamic link library APIs 514. Kernel data 500 is information accessed by components of kernel 406.

In the present example, hypervisor 214 stores the state of virtual hardware devices in kernel data 500. Hypervisor 214 uses this state to manage virtual hardware devices for virtual machine 403. For example, the state used to manage a virtual communications unit for virtual machine 403 might include data about a network connection in network connections 228 (see FIG. 2).

System APIs 502 are executable code for operating systems and are used to perform actions 218. For example, programs may use system APIs 502 to access hardware devices. In the illustrative example, system APIs 502 are for accessing at least one of memory 404, communications units, storage devices, displays, or other suitable types of hardware devices.

Driver data 504 comprises information accessed by drivers 414. For example, a driver might store a state in driver data 504 for a network connection in network connections 228. As another example, a driver in drivers 414 for a storage device might store a listing of files in driver data 504. In this example, the listing of files is for files stored on the storage device.

Driver APIs 506 are executable code for drivers 414. For example, programs may use driver APIs 506 to access hardware devices.

Application data 508 is data accessed by applications 410. APIs 510 are executable code for applications 410. When an application in applications 410 is a bash shell application, the bash shell application includes an API in APIs 510 that receives requests to perform actions 218 from adversary 216.

Dynamic link library data 512 is data accessed by at least one of applications 410, drivers 414, operating system 408, or dynamic link library APIs 514. Dynamic link library APIs 514 are executable codes for dynamic link libraries 412. When a dynamic link library in dynamic link libraries 412 is a networking library, the networking library might include a networking interface in dynamic link library APIs 514 for accessing a network connection in network connections 228.

Referring back to FIG. 4, kernel 406 also comprises virtual machine (VM) exit handler 418 and a virtual machine introspection (VMI) hook module 420, which enables threat manager 220 to perform VMI to observe the action 218 of adversary 216 without the adversary (threat actor) knowing it is being observed. The VMI module 420 is a kernel module that hooks the VM exit handler 418 during VM exits to gain complete control over guest virtual machines before the hypervisor 214 even knows the virtual machines have exited.

Figure 6:
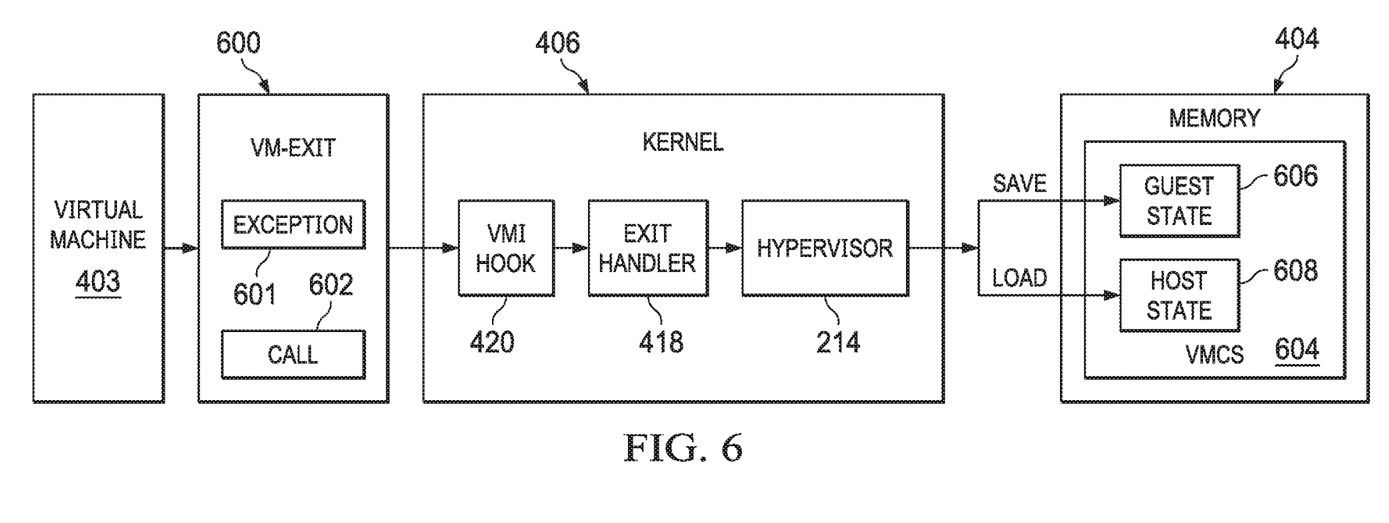
FIG. 6 is a block diagram of a vm-exit in accordance with an illustrative embodiment.

Turning to FIG. 6, a block diagram of a vm-exit is depicted in accordance with an illustrative embodiment. In this illustration, examples for types of vm-exit 600 for hypervisor 214 are shown. Generally speaking, an exit occurs in response to an instruction or system event that requires contact with the host processing system outside the virtual machine.

As depicted, vm-exit 600 is a source of information from virtual machines 403. In this illustrative example, vm-exit 600 is the result of an exception 601, a call 602, or some other suitable type of vm-exit triggering activity. An exception 601 is an unexpected event within a processor that disrupts the normal execution of instructions. A call 602 is an invoking of one of system API 502 for hypervisor 214.

There are two modes of operation under virtualization: root operations and non-root operations. Usually, only the hypervisor on the host system runs under root operation, while the guest operating systems and guest applications running on the virtual machines run under non-root operation. A vm-exit 600 is a transition from non-root operation to root operation. This transition is facilitated by exit handler 418.

To facilitate this transition between root and non-root operation a virtual machine control structure (VMCS) 604 is used. VMCS 604 is a data structure within memory 404 that is managed by hypervisor 214. The is one VMCS per virtual machine. VMCS 604 comprises a guest state area 606 and a host state area 606. The guest state 606 runs until virtual machine 403 performs an exception or call causing it to exit. In response to vm-exit 600 hypervisor saves guest state 606 of virtual machine 403 and loads host state 608 of host data processing system 400 into memory 404. In other words, the respective states of the guest virtual machine 403 and host system 400 are swapped in memory 404 by hypervisor 214. Upon vm-entry (not shown) host state 608 would be saved, and guest state 606 would be loaded to transition back to non-root operation.

Virtual machine 403 runs until something causes it to vm-exit 600, which passes control to hypervisor 214 and allows it to view and/or modify the guest state 606. However, as shown, VMI hook module 420 hooks exit handler 418 and gains complete control over virtual machine 403 before hypervisor 214 knows virtual machine 403 has exited. Hooking comprises intercepting function calls or messages between software components in order to alter or augment the behavior of an operating system, application, or other software components. By hooking exit handler 418, VMI hook module 420 allows threat manager 220 and/or an operator (e.g., Blue Team) to effectively become the hypervisor 214.

Exit handler hooking provides hypervisor-level execution during every vm-exit and permits writing any virtual machine guest state 606 desired. Exit handler hooking also allows modifying the hypervisor configuration/state such as, e.g., enabling or disabling hardware virtualization features or forcing future exit with various tricks. This manipulation at the hypervisor level is carried out without adversary 216 being aware it is being monitored and deceived, whether adversary 216 is on a live network of virtual machines such as operating network 206 or a deception network such as deception network 208. By altering and augmenting hypervisor responses to actions 218 taken by adversary 216, adversary 216 can be manipulated and provoked into revealing its capabilities that it would otherwise keep hidden if it knew it was being observed.

Figure 7:
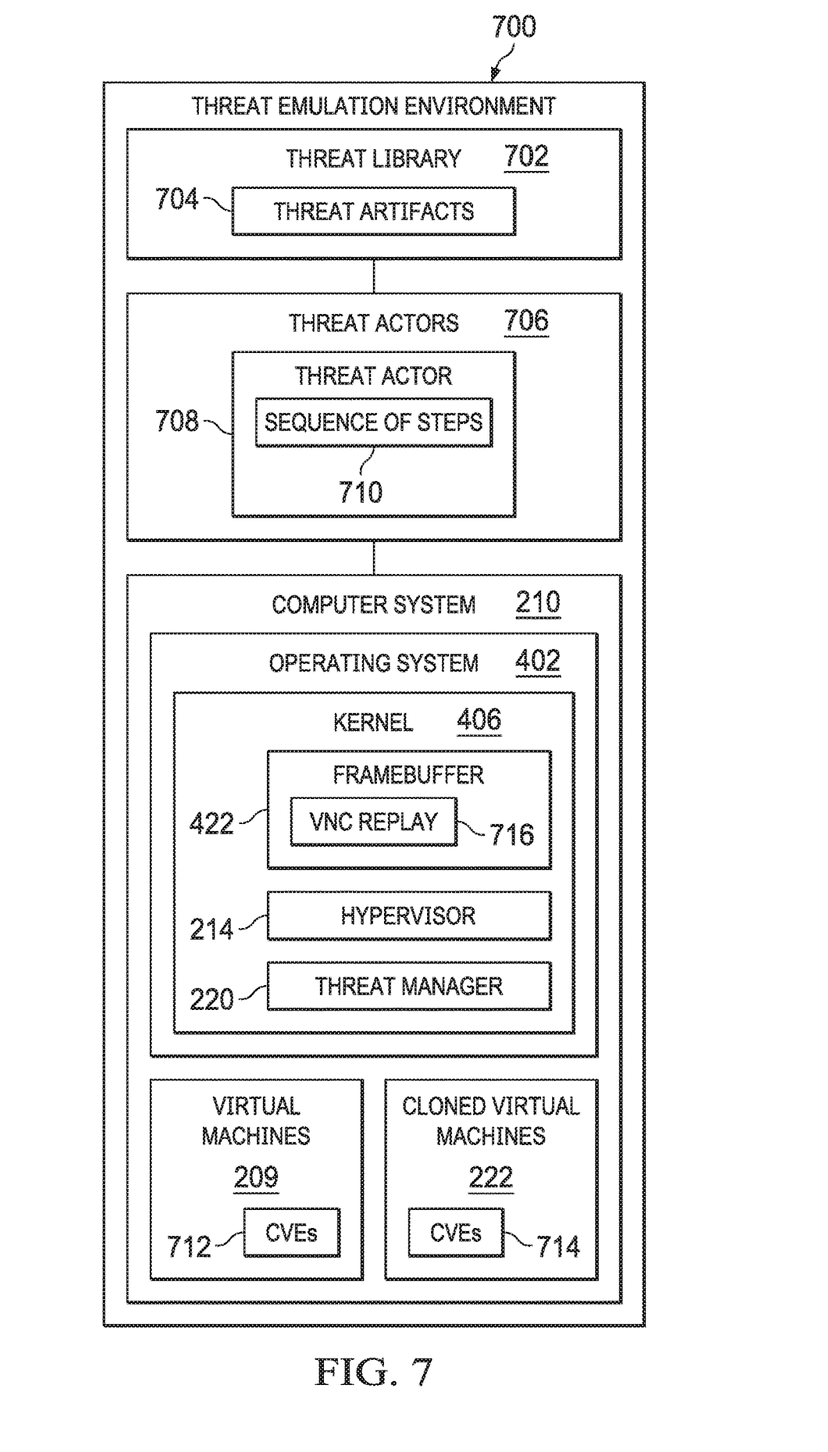
FIG. 7 is a block diagram depicting a threat emulation environment in accordance with illustrative embodiments.

FIG. 7 is a block diagram depicting a threat emulation environment in accordance with illustrative embodiments. Threat emulation environment 700 allows the creation and emulation of Advanced Persistent Threat (APT) attacks in a virtual network computing environment.

A threat library 702 comprises a number of threat artifacts 704 based on previously-observed and newly-generated threat models. These threat artifacts 704 can be combined into different combinations to create a number of emulated threat actors 706. Each threat actor 708 comprises a sequence of steps (attacks) created by the combination of threat artifacts 704.

A threat actor 708 can then be deployed against computer system 210 to test its response. Computer system 210 might be a fictional system designed to test a planned architecture against an emulated attack to evaluate its vulnerabilities (known or unknown) and the responses of its defensive countermeasures. Examples of vulnerabilities in the system include CVEs 712, 714 present in virtual machines 209 and cloned virtual machines 222 (assuming a deception network is employed in the architecture in question). CVEs 712, 714 might be inherent and unavoidable features of virtual machines 209 and cloned virtual machines 222. Alternatively, CVEs 712, 714 might be deliberately created to test the behavior of different actors 706 and/or responses capabilities of threat manager 220 to detect and mitigate the attack.

Alternatively, computer system 210 might be an existing, operational system. In this situation, threat actors 706 can be deployed to test the capabilities of the system countermeasures as well as the performance of Blue Team response by security personnel.

Illustrative embodiments employ custom extensions to the kernel framebuffer 422 to support virtual network computing (VNC) replay 716. Remote framebuffer (RFB) is a protocol used in VNC. VNC works in a client/server model (such as that shown in FIG. 1) wherein N+VNC clients share user input with the server. VNC servers capture local display framebuffer contents and share them back to the client, which can translate remote client input into local input.

By using the extensions to framebuffer 422, VNC replay 716 can be used to simulate specified time periods (e.g. days, weeks, months, etc.) of network transactions such as, e.g., web browsing, logging into email addresses, sending emails, sending link messages, opening documents, etc. VNC replay 716 happens at user speed so that the timing and interactions appear faithful to real humans using the network.

Figure 8:
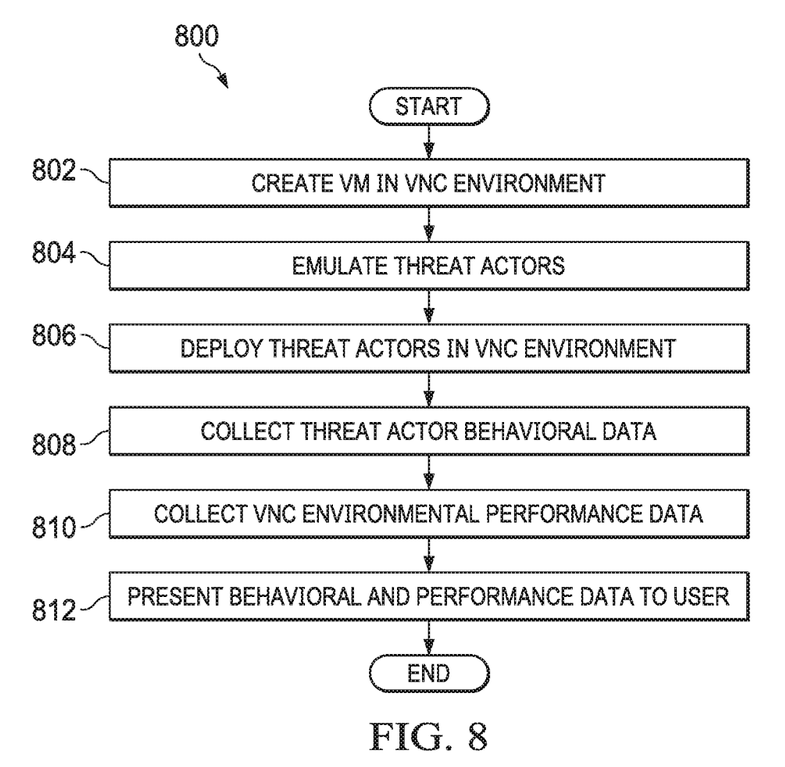
FIG. 8 is a flowchart of a process for emulating threats in virtual network computing environment in accordance with an illustrative embodiment.

FIG. 8 is a flowchart of a process for emulating threats in virtual network computing environment in accordance with an illustrative embodiment. Process 800 begins by creating a number of virtual machines in the virtual network computing environment (step 802). A number of threat actors are emulated, wherein each threat actor comprises a number of threat artifacts that form a sequence of attack steps against the virtual network computing environment (step 804).

The threat actors are then deployed against the virtual network computing environment (step 806). Behavioral data about actions of the threat actors in the virtual network computing environment is collected (step 808). Performance data about the virtual network computing environment in response to the threat actors is also collected (step 810). The collected behavioral and performance data is then presented to a user via an interface (step 812).

Figure 9:
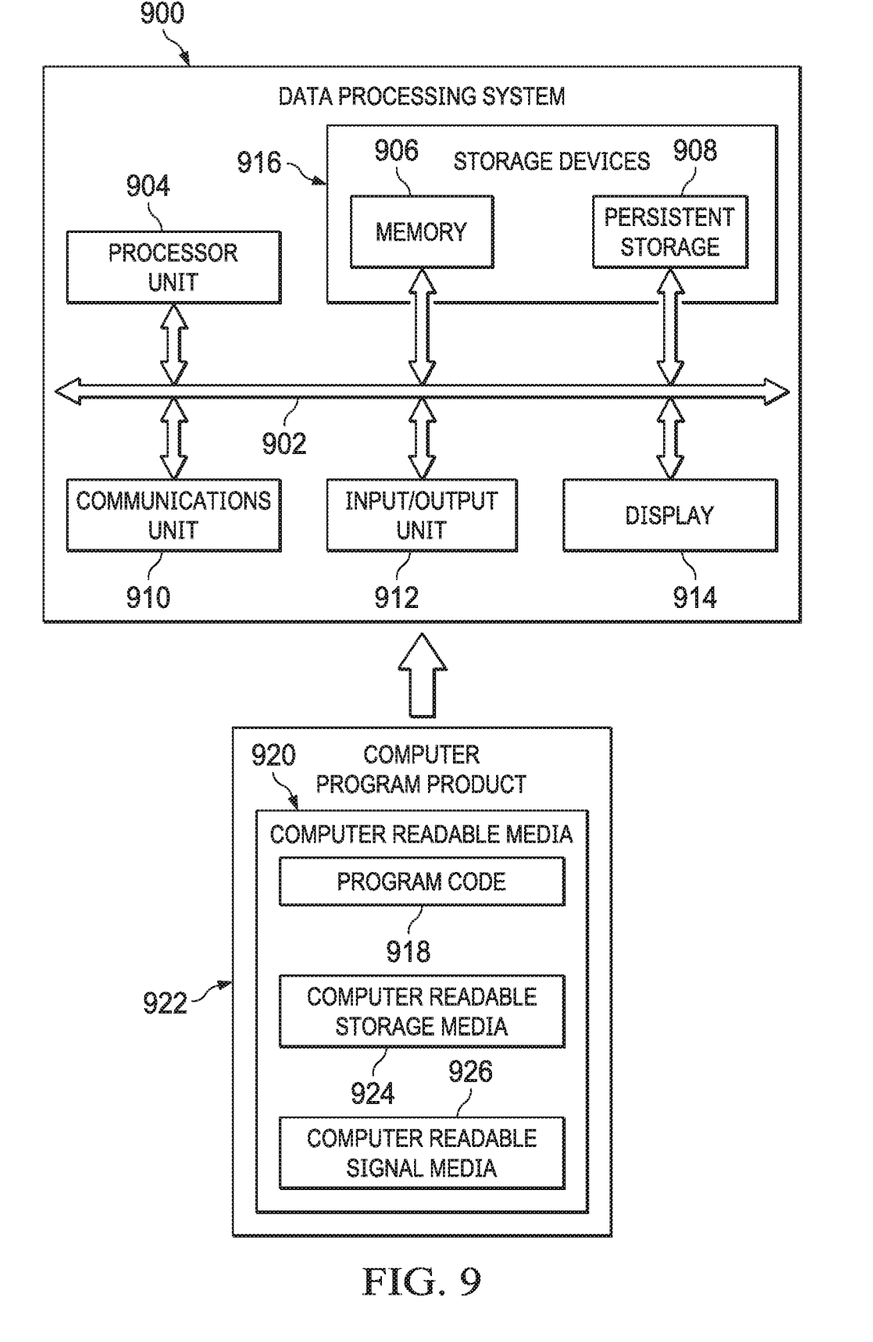
FIG. 9 is a block diagram of a data processing system in accordance with an illustrative embodiment.

Turning now to FIG. 9, a block diagram of a data processing system is depicted in accordance with an illustrative embodiment. Data processing system 900 may be used to implement computer system 110 in FIG. 1. In this illustrative example, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918. Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "a number" means one or more. The phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for emulating threats in a virtual network computing environment, the method comprising:

creating, by a number of processors, a number of virtual machines in the virtual network computing environment;
hooking a virtual machine exit handler to intercept function calls and exceptions to gain control over the number of virtual machines in the virtual network computing environment, wherein the function calls and exceptions require a transition from non-root mode operation to root mode operation;
emulating, by the number of processors, a number of threat actors, wherein each threat actor comprises a number of threat artifacts that form a sequence of attack steps against the virtual network computing environment;
deploying, by the number of processors, the threat actors against the virtual network computing environment;
collecting, by the number of processors, behavioral data about actions of the threat actors in the virtual network computing environment;
collecting, by the number of processors, performance data about the virtual network computing environment in response to the threat actors; and
presenting, by the number of processors, the collected behavioral and performance data to a user via an interface.

2. The method of claim 1, wherein collecting behavioral data about actions of the threat actors comprises virtual machine introspection without the threat actors knowing they are being observed.

3. The method of claim 1, wherein the threat artifacts comprising each threat actor are derived from a library of threat artifacts.

4. The method of claim 1, further comprising creating vulnerabilities in the virtual network computing environment to test threat actor behavior and network responses to attack.

5. The method of claim 1, wherein collecting performance data about the virtual network computing environment in response to the threat actors comprises testing the ability of sensors in the virtual network computing environment to detect threats.

6. The method of claim 1, further comprising using extensions to a framebuffer of a host computer system to provide virtual network computing replay that simulates specified time periods of network transactions, wherein the replay happens at user speed so that timing and interactions appear faithful to real humans using the network.

7. The method of claim 1 wherein each of the virtual machines in the virtual network computing environment is associated with a corresponding virtual machine control structure and wherein the virtual machine exit handler saves and restores state information regarding a virtual machine in response to intercepting one of the function calls and exceptions.

8. A computer program product for emulating threats in a virtual network computing environment, the computer program product comprising:
a non-volatile computer readable storage medium having program instructions embodied therewith, the program instructions executable by a number of processors to cause a computer to perform the steps of:
creating a number of virtual machines in the virtual network computing environment;
hooking a virtual machine exit handler to intercept function calls and exceptions to gain control over the number of virtual machines in the virtual network computing environment, wherein the function calls and exceptions require a transition from non-root mode operation to root mode operation;
emulating a number of threat actors, wherein each threat actor comprises a number of threat artifacts that form a sequence of attack steps against the virtual network computing environment;
deploying the threat actors against the virtual network computing environment;
collecting behavioral data about actions of the threat actors in the virtual network computing environment;
collecting performance data about the virtual network computing environment in response to the threat actors; and
presenting the collected behavioral and performance data to a user via an interface.

9. The computer program product of claim 8, wherein collecting behavioral data about actions of the threat actors comprises virtual machine introspection without the threat actors knowing they are being observed.

10. The computer program product of claim 8, wherein the threat artifacts comprising each threat actor are derived from a library of threat artifacts.

11. The computer program product of claim 8, further comprising instructions for creating vulnerabilities in the virtual network computing environment to test threat actor behavior and network responses to attack.

12. The computer program product of claim 8, wherein collecting performance data about the virtual network computing environment in response to the threat actors comprises testing the ability of sensors in the virtual network computing environment to detect threats.

13. The computer program product of claim 8, further comprising extensions to a framebuffer of a host computer system to provide virtual network computing replay that simulates specified time periods of network transactions, wherein the replay happens at user speed so that timing and interactions appear faithful to real humans using the network.

14. The computer program product of claim 8 wherein each of the virtual machines in the virtual network computing environment is associated with a corresponding virtual machine control structure and wherein the virtual machine exit handler saves and restores state information regarding a virtual machine in response to intercepting one of the function calls and exceptions.

15. A system for emulating threats in a virtual network computing environment, the system comprising:
a bus system;
a storage device connected to the bus system, wherein the storage device stores program instructions; and
a number of processors connected to the bus system, wherein the number of processors execute the program instructions to:
create a number of virtual machines in the virtual network computing environment;
hook a virtual machine exit handler to intercept function calls and exceptions to gain control over the number of virtual machines in the virtual network computing environment, wherein the function calls and exceptions require a transition from non-root mode operation to root mode operation;
emulate a number of threat actors, wherein each threat actor comprises a number of threat artifacts that form a sequence of attack steps against the virtual network computing environment;
deploy the threat actors against the virtual network computing environment;

collect behavioral data about actions of the threat actors in the virtual network computing environment;

collect performance data about the virtual network computing environment in response to the threat actors; and present the collected behavioral and performance data to a user via an interface.

16. The system of claim 15, wherein collecting behavioral data about actions of the threat actors comprises virtual machine introspection without the threat actors knowing they are being observed.

17. The system of claim 15, wherein the threat artifacts comprising each threat actor are derived from a library of threat artifacts.

18. The system of claim 15, wherein the processors further execute instructions to create vulnerabilities in the virtual network computing environment to test threat actor behavior and network responses to attack.

19. The system of claim 15, wherein collecting performance data about the virtual network computing environment in response to the threat actors comprises testing the ability of sensors in the virtual network computing environment to detect threats.

20. The system of claim 15, further comprising extensions to a framebuffer of a host computer system configured to provide virtual network computing replay that simulates specified time periods of network transactions, wherein the replay happens at user speed so that timing and interactions appear faithful to real humans using the network.

21. The system of claim 15 wherein each of the virtual machines in the virtual network computing environment is associated with a corresponding virtual machine control structure and wherein the virtual machine exit handler saves and restores state information regarding a virtual machine in response to intercepting one of the function calls and exceptions.

\* \* \* \* \*